United States Patent
Chandler et al.

(10) Patent No.: US 9,692,841 B1
(45) Date of Patent: Jun. 27, 2017

(54) CONSUMING CONTENT ITEMS COLLABORATIVELY

(71) Applicant: Amazon Technologies, Inc., Reno, NV (US)

(72) Inventors: Otis Yeager Chandler, San Francisco, CA (US); Jessica Kathleen Quinn Donaghy, San Francisco, CA (US); Seth Gershom Goldstein, San Francisco, CA (US); Peter Thomas Killalea, Seattle, WA (US); Brian Mitchell Percival, San Carlos, CA (US); Kartik Swaminadan Santhanakrishnan, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 393 days.

(21) Appl. No.: 14/298,166

(22) Filed: Jun. 6, 2014

(51) Int. Cl.
*G06F 15/16* (2006.01)
*H04L 29/08* (2006.01)

(52) U.S. Cl.
CPC ............ *H04L 67/22* (2013.01); *H04L 67/10* (2013.01)

(58) Field of Classification Search
USPC ........ 709/220, 204, 203; 715/776, 758, 742; 370/261
See application file for complete search history.

(56) References Cited

U.S. PATENT DOCUMENTS

| | | | | |
|---|---|---|---|---|
| 8,832,091 | B1* | 9/2014 | Bhagat | G06F 17/30958 707/723 |
| 8,892,630 | B1* | 11/2014 | Curtis | G06Q 30/0282 709/203 |
| 9,128,591 | B1* | 9/2015 | Arora | G06F 17/30876 |
| 9,202,233 | B1* | 12/2015 | Siegel | G06Q 30/0252 |
| 9,356,904 | B1* | 5/2016 | Ho | H04L 51/32 |
| 2008/0144537 | A1* | 6/2008 | Vadhri | G06Q 10/10 370/261 |
| 2013/0198273 | A1* | 8/2013 | Vago | H04L 67/42 709/203 |
| 2014/0156413 | A1* | 6/2014 | Cameron | G06Q 30/0269 705/14.61 |
| 2014/0282205 | A1* | 9/2014 | Teplitsky | G06F 3/0483 715/776 |
| 2015/0372965 | A1* | 12/2015 | Seon | H04L 51/38 715/758 |
| 2016/0162124 | A1* | 6/2016 | Tahir | G06F 3/04817 715/742 |
| 2016/0246464 | A1* | 8/2016 | Havard | G06F 3/048 |

* cited by examiner

*Primary Examiner* — Tammy Nguyen
(74) *Attorney, Agent, or Firm* — Lee & Hayes, PLLC (57) ABSTRACT

Techniques for facilitating collaborative consumption of content items, such as electronic books, movies, videos, songs, and the like. Multiple users may consume a content item over a substantially common period of time, such as over a day, week, month, etc. Each user may utilize one or more electronic devices (e.g., electronic book reader devices, tablet devices, laptop computers, etc.) to consume the item, and each user may share his or her thoughts and may otherwise provide progress updates to the other users over the period of time.

17 Claims, 5 Drawing Sheets

Fig. 5

CONSUMING CONTENT ITEMS COLLABORATIVELY

BACKGROUND

A large and growing population of users employs various electronic devices to consume digital content, such as music, movies, images, electronic books, and so on. Among these electronic devices are electronic book (eBook) reader devices, cellular telephones, desktop computers, portable media players, tablet computers, netbooks, and the like.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure describes, in part, techniques for facilitating collaborative consumption of content items, such as electronic books, movies, videos, songs, and the like. As described below, multiple users may consume a content item over a substantially common period of time, such as over a day, week, month, etc. Each user may utilize one or more electronic devices (e.g., electronic book reader devices, tablet devices, laptop computers, etc.) to consume the item, and each user may share his or her thoughts and may otherwise provide progress updates to the other users over the period of time.

To begin, a user may invite one or more other users to collaboratively consume a content item, or a service may connect two or more users for this purpose. In the former instances, a first user may send an invitation to a second user, who may accept or decline this request. If the second user accepts this invitation, then the devices on which the first and second users use to consume the content items may send information regarding the consumption to the device(s) of the other user.

In instances where a service connects two or more users to collaboratively consume a content item, the service may connect these users based on one or more characteristics of the users. For instance, if a first user indicates, to the service, an interest in collaboratively reading a particular book with one or more other users, the service may identify one or more other users that have expressed a desire to read this same electronic book. For instance, the service may identify one or more users that have purchased (but not read) the electronic book, users that have added the book to a list of books they would like to read, or the like. The service may also take other criteria into account, such as a geographical location of the users, reading speeds of the users, content items previously consumed by the users, demographic information (e.g., age, etc.) of the users, and the like. In some instances, the service may identify, as candidates to collaboratively read the electronic book, those users that have similar reading speeds, users that have previously consumed similar content items, users that have similar interests, and the like. In some instances, a first user that invites a second user to participate in a collaborative consumption session may pay for some or an entire cost of the content item, which the invitation to the second user may indicate. That is, an invitation from a first user may encourage the second user to join the collaborative session by indicating that the first user will offset some or all of the cost associated with obtaining rights to the content item.

After identifying one or more users that may make good matches for consuming a content item collaboratively with the requesting user, the service may send an indication of this recommendation to the requesting user. The requesting user may then send an invite to consume the content item collaboratively to the other user(s). The other users may receive (via the user's device or via the service) this invitation at their respective devices. Each user may then send an acceptance or rejection of this invitation. In the former instances, this ad-hoc "reading group" may begin sharing information regarding consumption of the content item, such as the electronic book.

Any type and amount of information may be shared during the collaborative consumption of a content item, a portion of which applications executing on the device may automatically generate, and another portion of which users may provide. For instance, when a user finishes a portion of an electronic book (e.g., a chapter in a book, a scene in a movie, etc.), a device of the user may send an indication of this completion to one or more other devices that are participating in the collaborative session. Additionally or alternatively, the user herself may generate and send commentary to these other devices, such as the user's thoughts on a particular chapter of the content item, or the like. In some instances, a user may select the group to which the information is to be provided. For instance, a first annotation may be shared with a single friend or contact, while another annotation may be shared amongst all of a user's friends or contacts. A non-limiting list of example consumption information that may be shared amongst the users includes:

- a current location of a user in the content item, such as a page that the user left off on in an electronic book, a running time in a movie last watched by the user, or the like (e.g., "Joe is at 1:34 of your shared movie");
- a portion of the content item that a user has just completed, such as a chapter in a book completed by the user, a scene in a video just watched by the user, or the like (e.g., "Joe just finished chapter 3 of your shared book");

a consumption speed (e.g., reading speed) of a user (e.g., "Joe is reading, on average 1.5 chapters of your shared book per day");

a time of day that a user consumed the content item ("Joe has been listening to your shared audio lecture each morning this week");

a geographical location at which a user consumed the content item ("Joe just read a chapter of your shared book in St. Louis, Mo.", "Joe just finished your shared book at a local Starbucks", etc.); or an indication of when a user begins to consume the item (e.g., notifying other users when a user begins to read her book, such as "Joe just began reading 'Pride and Prejudice'").

In addition to sharing the example information listed above, the techniques may provide real-time information to users. For instance, if a user is reading a particular book with one or more other users, each user of this group may be able to view a current location of each other user. For instance, each device may display a progress bar that graphically indicates where each person is within the book. For instance, the progress bar may include a mark (e.g., an avatar, dash mark, etc.) of where the user is on the progress bar. In another example, each device may render a progress bar for each user (e.g., a device may illustrate three progress bars in an example where three users are reading a same book). Furthermore, this progress bar (or progress bars) may indicate certain reading statistics associated with each user, such as a reading speed, total reading time of the book, or the like.

Furthermore, in some instances a device of a user or the service may "unlock" portions of a content item based on users' progress through the content item. To provide an example, if three users are reading an electronic book collaboratively, then the service may progressively grant these users access to portions of the book as the users progress through the book. For instance, when the users begin to read a first chapter of the book, the service may restrict access to the second (and subsequent) chapter until a threshold number of the users finish the first chapter, at which point the service may grant access to the second chapter. The service (or a device of a user) may grant access to this chapter by, for instance, sending the chapter to the device, sending a key to decrypt data associated with the second chapter already stored on the devices, or the like. In another example, rights to the item (e.g., the book) may be passed amongst the client devices such that the users are able to consume the content item sequentially. For instance, a device of the first user may have access to the book while the devices associated with the other users do not, after which a device associated with the second user receives access to the book while the others do not, and so forth.

In still other instances, certain incentives may be offered for consuming the content item. For instance, where the group of users collaboratively read a book (and, hence, may comprise a virtual reading group), then a first user to complete the book may be allowed to choose the subsequent book for the group. In other examples, the subsequent book or content item may be determined based on lists that the users have compiled, such as the users' "to-read lists". For instance, a book that appears in the greatest number of "to-read lists" of the users of the virtual reading group may be selected as the next book.

The techniques for consuming content items collaboratively may be implemented in a variety of ways and by a variety of electronic devices. While a few examples are illustrated and described below, it is to be appreciated that other electronic devices may implement any similar or different techniques. Furthermore, it is noted that the term "electronic book", "eBook", or "content item" as used herein, may include any type of content which can be stored and distributed in digital form. By way of illustration, and without limitation, electronic books and content items can include all forms of textual information such as books, magazines, newspapers, newsletters, periodicals, journals, reference materials, telephone books, anthologies, proceedings of meeting, forms, directories, maps, manuals, guides, references, photographs, articles, reports, documents, etc., and all forms of audio and audiovisual works such as music, multimedia presentations, audio books, movies, etc.

Figure 1:
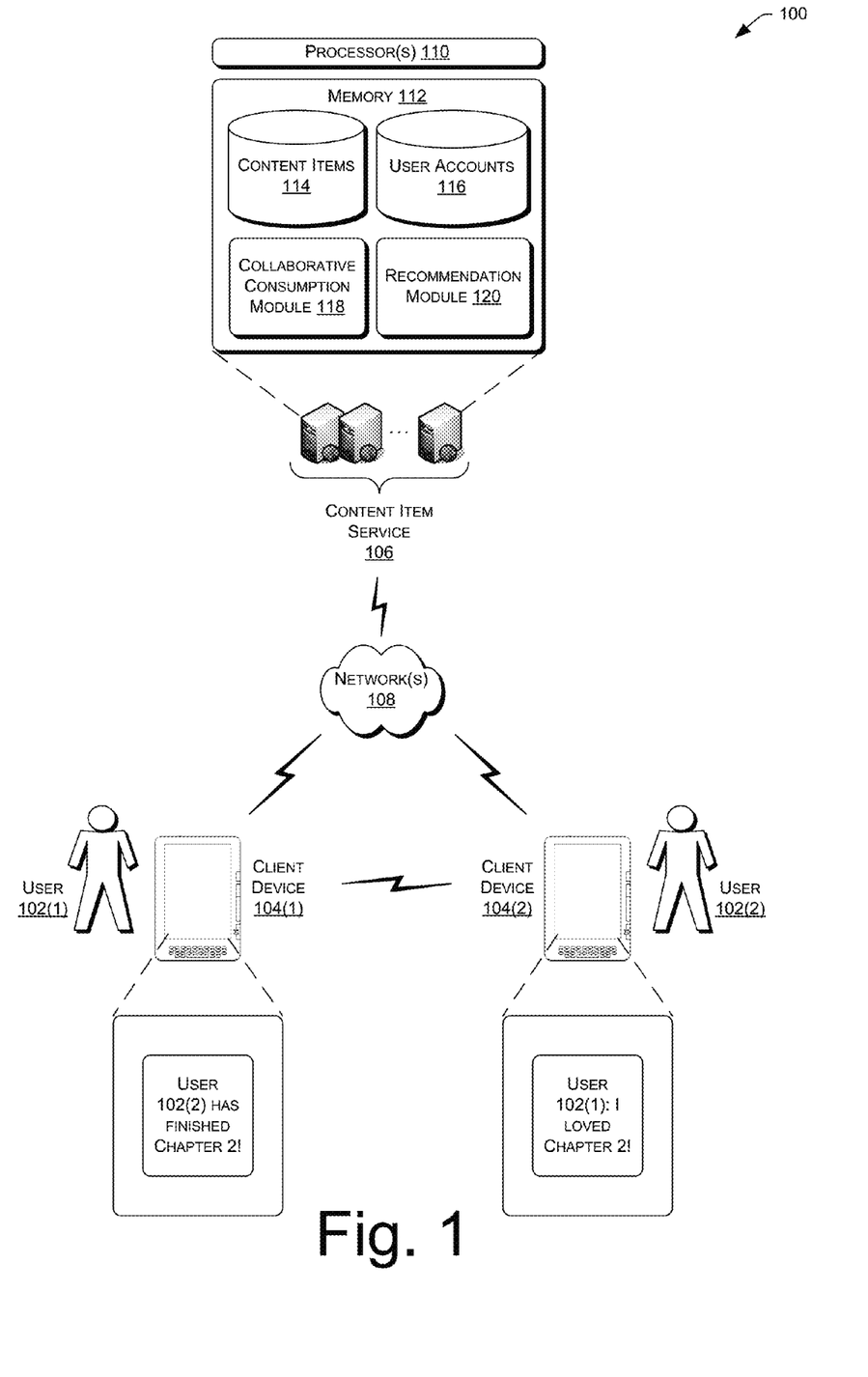
FIG. 1 illustrates an example environment in which two or more users may consume a content item, such as an electronic book, collaboratively. For instance, as each user progresses through the electronic book, a device of the user may send updates indicating this progress to one or more devices of other users that are also reading the electronic book.

FIG. 1 illustrates an example environment 100 that includes a user 102(1) operating an electronic device 104(1) and a user 102(2) operating an electronic device 104(2), with these users consuming a content item collaboratively with one another. While FIG. 1 illustrates the devices as electronic book reader devices, the devices may additionally or alternatively operate tablet computing devices, laptop computers, desktop computers, or the like. Furthermore, in some instances a user may consume a content item in a physical form and may input information associated with this consumption via an electronic device. For example, a user may read a physical book and may input information regarding his or her location, commentary, or the like into an electronic device, such that this information may be shared as described below.

Within this environment 100, the users 102(1) and 102(2) may each consume a common content item on one or more respective devices while sharing information regarding this consumption with the other user, potentially among multiple other users. For instance, these users may each read a same electronic book on their respective devices, while providing information regarding their reading to the other user's device. The devices themselves may provide and share this information, or this information may be shared through a content-item service 106. For example, the client devices may provide information such as current locations of the users within the content item, a consumption speed within the content item, an indication of when the respective user is consuming the content item, or the like. The content items may comprise electronic books, songs, movies, or the like.

In the illustrated example, each of the users 102(1) and 102(2) utilizes their respective electronic device(s) to read an electronic book. Each device may then provide progress updates, potentially along with commentary from a user, with the other device. For instance, FIG. 1 illustrates that the device 104(2) has provided, to the device 104(1), an indication that the user 102(2) "has finished chapter 2!", as the client device 104(1) displays. The device 104(1), meanwhile, has provided, to the device 104(2), the following commentary provided by the user 102(1): "I loved chapter 2!" Therefore, as the users progress through the book, the devices may automatically share information with one another for presentation to the users, while the users may also explicitly provide commentary and otherwise interact with one another during the collaborative reading process.

As discussed above, the devices 104(1) and 104(2) may communicate directly with one another or may interact with one another via the content-item service 106. In either instance, the devices may communicate over a network 108, which represents any one or more wired or wireless communications networks. The content-item service 106, meanwhile, is shown to include one or more processors 110 and memory 112, which may have access to one or more content items 114, information associated with user accounts 116, a collaborative consumption module 118, and a recommendations module 120. In some instances, some or all of these datastores and modules may reside additionally or alternatively on a client device.

The content items 114 may comprise an array of items that are accessible to the client device 104(1) and 104(2), such as electronic books, movies, or the like. The information 116, meanwhile, indicates information associated with each of multiple user accounts, such as information associated with accounts of the users 102(1) and 102(2). This information may include device identifiers associated with a user account, content items stored on or otherwise accessible to the corresponding client devices, content items that the user has previously consumed, demographic information associated with the corresponding user (e.g., age, geographical location, etc.), indications of content items that the user has indicated a desire to consume (e.g., via a wish list or "to-read" list), a current location of the user within one or more content items, consumption metrics (e.g., reading speed, time of day of user reading sessions, etc.) of the user, and the like.

The recommendation module 120 may use the information 116 associated with the user accounts for the purpose of recommending users to collaboratively consume content items with one another. For instance, if the first user indicates a desire to collaboratively read a particular book with another user, the recommendation module 120 may generate a recommendation of another user to invite to do so. The module 120 may generate this recommendation by identifying users that have also indicated a desire to read the book, demographic information of other users, a similarity between the users' previously consumed content items, a similarity in consumption metrics (e.g., a reading speed of a user, an amount of time a user spends to complete an electronic book, or a time of day at which a user reads electronic books), and the like.

After generating a recommendation of one or more users, the module 120 may send this recommendation to a device, such as the device 104(1) of the user 102(1) or the module 120 may itself send an invitation to consume the item collaboratively with the user 102(1). Conversely, the user 102(1) may determine whether or not to invite the recommended user(s) to participate in collaborative reading.

In the illustrated example, the users 102(1) and 102(2) have agreed to read an electronic book collaboratively. As such, the collaborative consumption module 118 (either executing on the service 106 and/or the devices 104(1) and 1042) may share information across the devices 104(1) 10(2) as the users read the electronic book. This information may comprise progress updates, commentary from the users, or the like. As described above, in some instances one or both of the users may actually read the book in physical form and may input information regarding this consumption (e.g., a current location, commentary, highlights in the physical book, etc.) via an electronic device (e.g., a laptop computer, mobile phone, etc.). The electronic device may then share this information in the manners described above.

Figure 2:
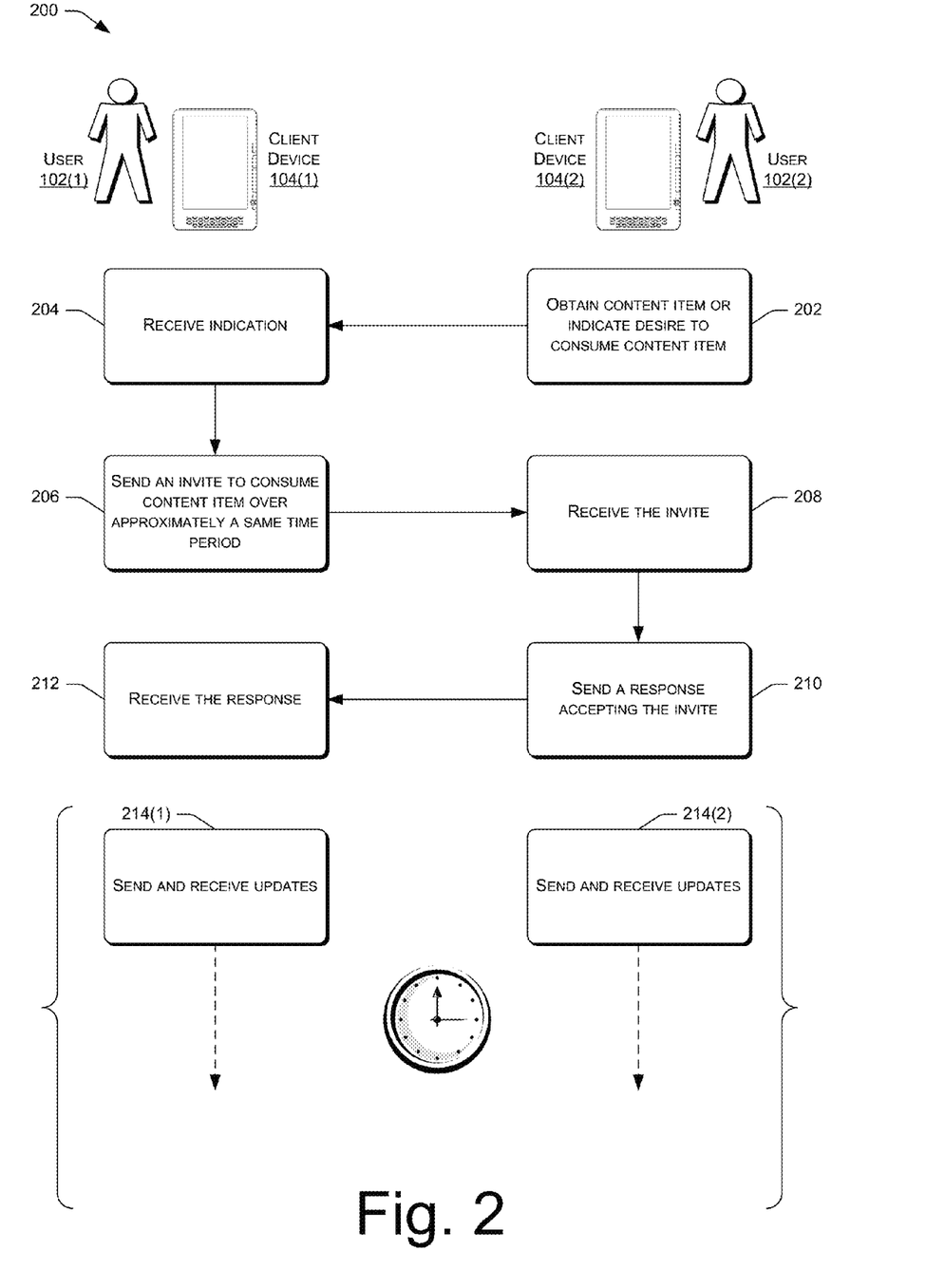
FIG. 2 illustrates an example process in which a first user invites a second user to consume a content item over approximately a same time period as the first user, such that the first and second users may share their progress, thoughts, and the like as they progress through the content item.

FIG. 2 illustrates an example process 200 in which a first user invites a second user to consume a content item over a schedule that approximately coincides with the first user (e.g., approximately over a same time period as the first user), such that the first and second users may share their progress, thoughts, and the like as they progress through the content item. The processes discussed below are each illustrated as a collection of blocks in a logical flow graph, which represent a sequence of operations that can be implemented in hardware, software, or a combination thereof. In the context of software, the blocks represent computer-executable instructions stored on one or more computer-readable media that, when executed by one or more processing units, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In addition, the processes described herein may be performed by a client device, a service that is remote from a client device, or a combination thereof.

At 202, the user 102(2) or the client device 104(2) of the user either obtains a particular content item (e.g., rents, purchases, downloads, etc.) or indicates a desire to consume the content item and, at 204, the client device 104(1) may receive a corresponding indication. For instance, if the user 102(1) has previously also expressed a desire to consume the particular content item, then the content-item service 106 may provide an indication of this shared interest to the user 102(1).

Potentially in response to receiving the indication at 204, the client device 104(1) may, at 206, send an invitation to the user 102(2) to consume the particular content item over substantially a same period of time as the user 102(1). That is, the user 102(1) may invite the user 102(2) to collaboratively consume the content item with the user 102(1), which may include apprising one another of their respective progress through the item, providing commentary regarding the item to each other, and the like.

In some instances, the users may consume the content item period at exactly or nearly exactly the same time. That is, devices of the user's may be synchronized as the devices render the items. For instance, the client device 104(1) of the user 102(1) and the client device 104(2) of the user 102(2) may "turn pages" in a book at the same time. For instance, one of the users may be able to control when the pages turn within the book, or the devices may require that each person has requested to turn the page before the page is actually turned. In another example, music may be played (e.g., locally, streamed, etc.) on the devices at exactly or nearly exactly the same time. As such, the users 102(1) and 102(2) are hearing the same music at the exact or nearly the exact same time.

In some instances, the devices may prevent the users that are collaboratively sharing a content item from becoming too far apart from one another at any given time. For instance, each device may determine the location of the user of the other device such that the devices will only output portions of the content item that are a threshold distance ahead of the other device. For instance, the user 102(1) may only be allowed to be a certain amount of chapters (e.g., one chapter) ahead of the user 102(2) and vice versa. In another example, the user 102(1) may only be allowed to be a certain number of minutes ahead of the user 102(2) in a video or song, and the like.

At 208, the client device 104(2) of the user 102(2) receives the invitation and, at 210, sends a response accepting the invitation. At 212, the client device 104(1) receives the response. Thereafter, the devices 104(1) and 104(2)—potentially along with other devices associated with the accounts of the users 102(1) and 102(2) at the content-item service—may share information through the consumption process. For instance, as represented by 214(1) and 214(2), the devices 104(1) and 104(2) may both send and receive updates regarding the respective users' consumption of the particular content item. For instance, a device may send an indication to the other device when a user begins to read, finishes a chapter, shares or highlights a passage, finishes a reading session, or the like. Additionally, each user may provide commentary to one another during the consumption process. Furthermore, while FIG. 2 illustrates two users participating in the process 200, in some instances any other number of users may also participate in the collaborative consumption process.

Figure 3:
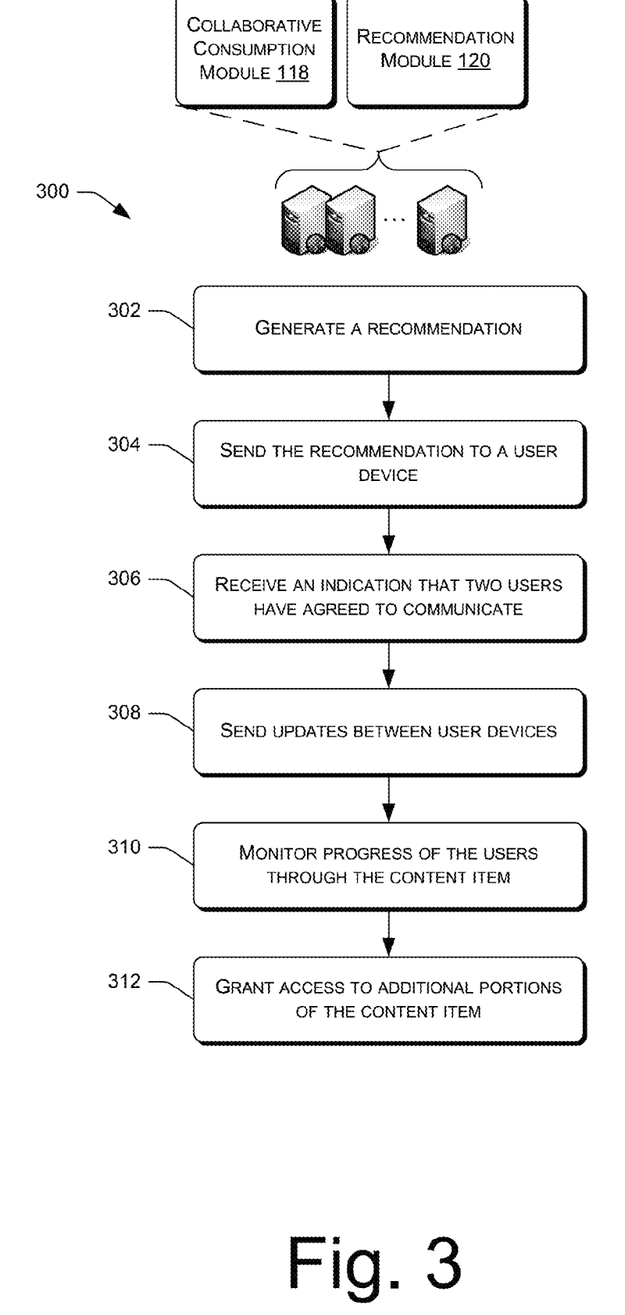
FIG. 3 illustrates an example process where a content-item service recommends, to a user, that the user consume a content item collaboratively with another user. For example, each of the users may indicated a desire to consume the particular content item and, therefore, the service may suggest that they consume the item collaboratively over approximately the same period of time.

FIG. 3 illustrates an example process 300 where a content-item service recommends, to a user, that the user consume a content item collaboratively with another user. For example, each of the users may indicate a desire to consume the particular content item and, therefore, the service may suggest that they consume the item collaboratively over approximately the same period of time. In some instances, the collaborative consumption module 118 and the recommendation module 120 may perform this process 300. These modules 118 and 120 may reside on the content-item service 106 (as illustrated) or may reside on client device.

At 302, the recommendation module generates a recommendation of a user that another user may be interested in inviting to participate in a collaborative consumption experience. For instance, if a first user has expressed an interest in reading a particular book with another user, the module may send an indication of a second user that the first user may consider inviting to read the book with the first user. In some instances, the module generates this recommendation based on similarities between the users, such as both have expressed a desire to consume a particular content item, the users having previously consumed similar content items, the users having similar consumption metrics (e.g., reading speeds, preferred consumption time of day, etc.), and the like.

At 304, the recommendation module 120 may send the recommendation to a user device, which may output this recommendation to a corresponding user. The user may or may not choose to invite the recommended user to participate in the collaborative consumption process. At 306, however, the module 120 receives an indication that both users have agreed to communicate during consumption of a particular content item. That is, the first user has indeed invited the second user to collaboratively consume the content item and the second user has agreed to do so. As such, these users will communicate during consumption of the item, via automatically generated updates, commentary provided by the users, and the like.

At 308, the collaborative consumption module 118 sends updates between the user devices. Again, these updates may indicate when a corresponding user completes a particular portion of the content item, begins to consume the content item, or the like. The updates may also include commentary from a corresponding user.

At 310, the collaborative consumption module 118 also monitors progress of the users through the content item. In some instances, the module 118 may "unlock" or otherwise grant the users access to portions of the content item based upon their progress. For instance, at 312, the module 112 grants the user devices access to additional portions of the content item based upon the monitoring. For example, the module 118 may unlock chapters of an electronic book based upon a threshold number or percentage of readers of a reading group having finished a particular preceding chapter.

Figure 4:
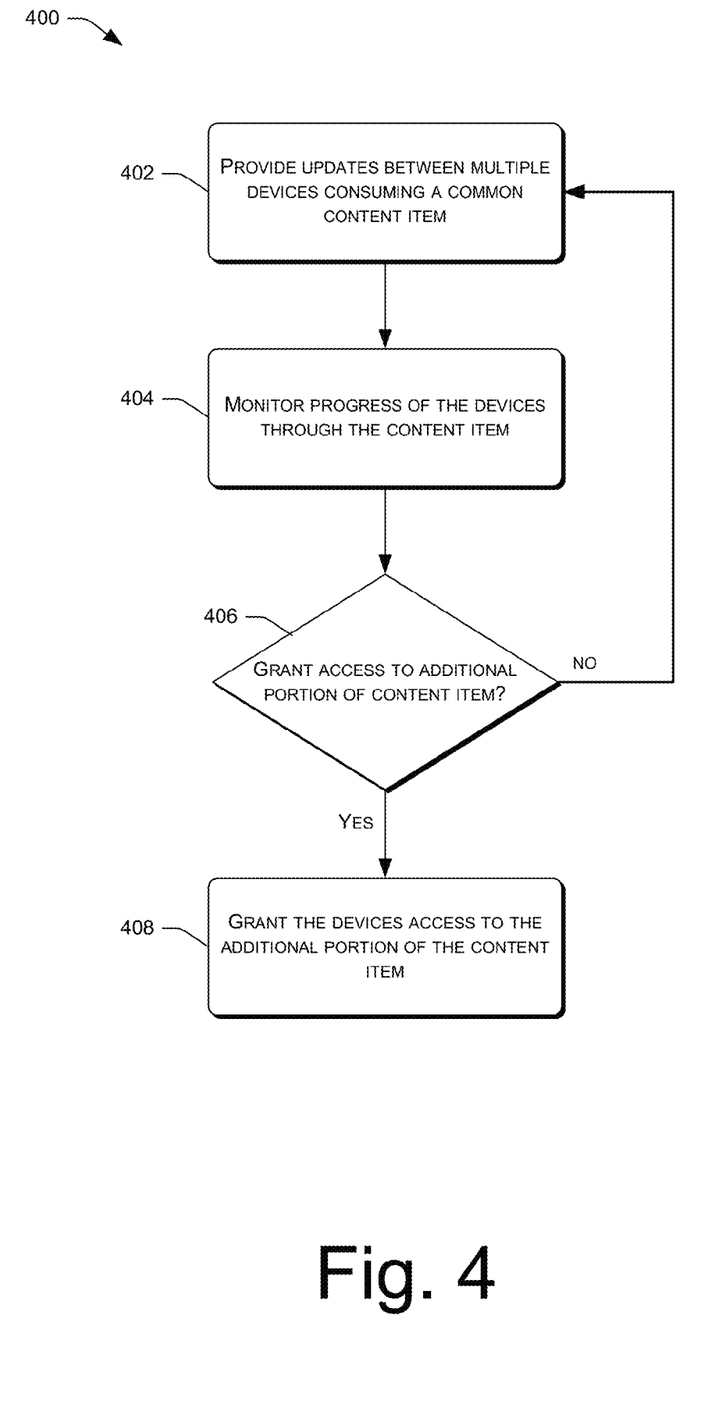
FIG. 4 illustrates an example process of granting users who are collaboratively consuming a content item access to portions of the content item as the users progress within the item. For instance, in response to multiple users finishing a chapter of an electronic book, the process may grant these users access to a subsequent chapter of the book.

FIG. 4 illustrates an example process 400 of granting users who are collaboratively consuming a content item access to portions of the content item as the users progress within the item. For instance, in response to multiple users finishing a chapter of an electronic book, the process 400 may grant these users access to a subsequent chapter of the book.

At 402, the process 400 provides updates regarding users' consumption of a content item, as described above. At 404, the process 400 monitors progress of the users through the content item. For instance, user devices may send periodic updates of their current location such that the content-item service is able to maintain an up-to-date record of the different locations of the users within the common content item. In other instances a client device maintains this record.

At 406, the process 400 determines whether or not to grant additional access to a portion of the content item based upon the monitoring. For instance, in the example where a certain number of readers of a reading group must finish a particular chapter before a subsequent chapter is unlocked, the process 400 may determine whether the threshold number of readers has achieved this benchmark. If not, then the process 400 returns to providing updates and monitoring the progress. If so, then the process 400 grants the devices access to the additional portion of the content item at 408. As described above, this may include providing the portion of the item to the devices, providing a key to decrypt this portion already stored on the user devices, or simply providing an instruction to the devices indicating that the users may proceed to the next portion of the item with the rest of the collaborative consumption group.

Figure 5:
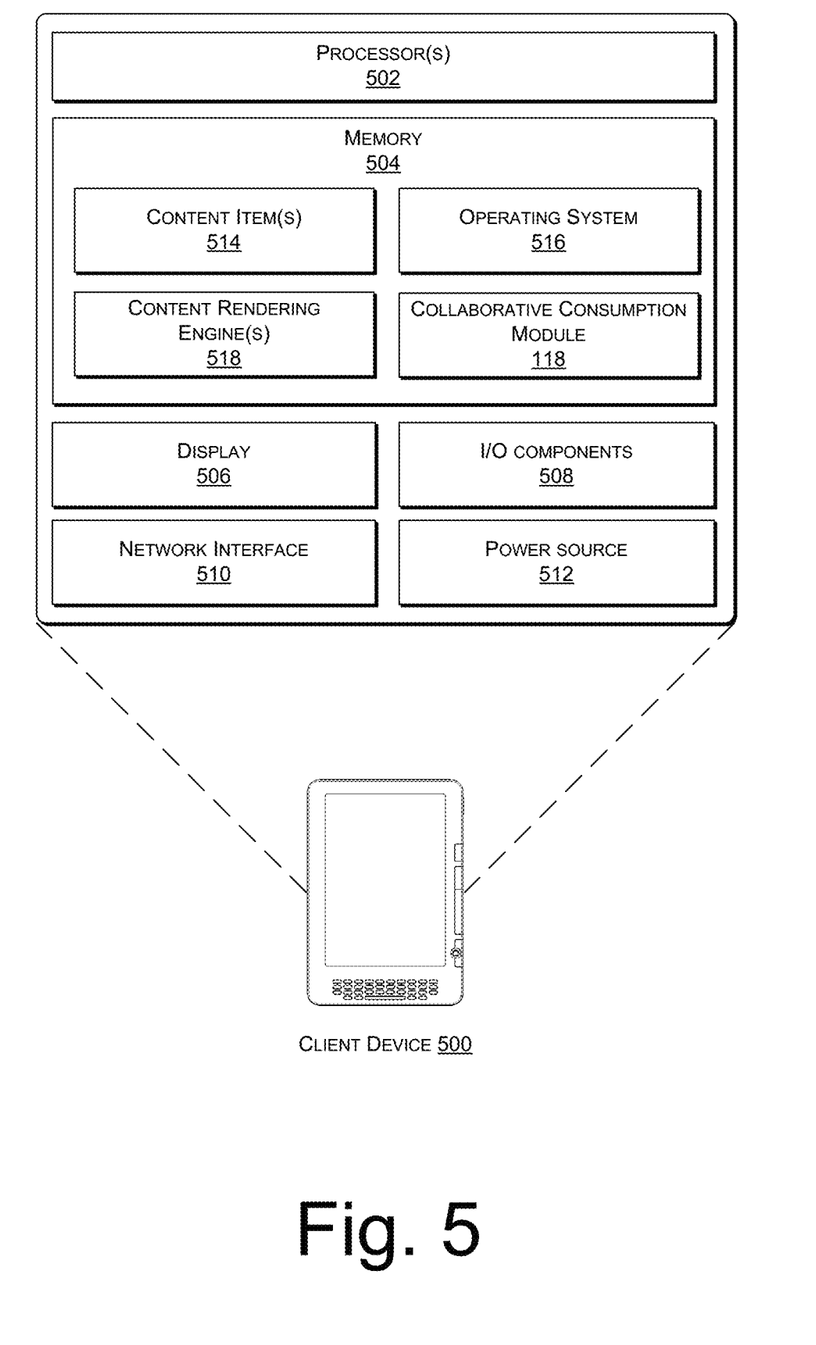
FIG. 5 illustrates an example electronic device that includes features for implementing the techniques described herein.

FIG. 5 illustrates an example electronic device 500 that includes features for implementing the techniques described herein. As illustrated, the electronic device 500 may include one or more processors 502 and memory 504, one or more displays 506 for displaying content items, one or more I/O components 508 for interacting with the device, one or more network interfaces 510, and one or more power sources 512. The network interfaces 510 may support both wired and wireless connection to various networks, such as cellular networks, radio, WiFi networks, short range networks (e.g., Bluetooth®), infrared (IR), and so forth.

Depending on the configuration of the electronic device 500, the memory 504 (and other memory described throughout) is an example of computer storage media and may include volatile and nonvolatile memory. Thus, the memory 504 may include, but is not limited to, RAM, ROM, EEPROM, flash memory, or other memory technology, or any other medium that can be used to store computer-readable instructions, programs, applications, media items, and/or data which can be accessed by the electronic device 500. In some examples, the computer-readable media is a tangible non-transitory computer-readable media.

The memory 504 may be used to store any number of functional components that are executable on the processor 502, as well as content items 514 that are rendered by the electronic device 500. The memory 504 may also store an operating system 516, one or more content rendering engines 518 to render content items on the device 500, and the collaborative consumption module 118 described above. The content presentation engines may be implemented as various applications depending upon the content items. For instance, the content presentation engine may be an electronic book reader application for rending textual electronic books, an audio player for playing audio books or songs, a video player for playing video, and so forth.

While FIG. 5 illustrates a few example components, the electronic device 500 may have additional features or functionality. For example, the device 500 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data. In addition, some or all of the functionality described as residing within the device 500 may reside remotely from the device 500 in some implementations.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method comprising:
   receiving, at a first client device associated with an account of a first user, an invitation to read an electronic book over approximately a same period of time as a second user;
   sending, by the first client device, a response to the invitation, the response indicating that the first user has accepted the invitation to read the electronic book over approximately the same period of time as the second user;
   detecting, by the first electronic device, that the first client device has displayed all pages of a chapter of the electronic book;
   sending, by the first client device, and based at least in part on the detecting, one or more first updates to a second client device associated with an account of the second user, the one or more first updates indicating that the first user has completed the chapter of the electronic book on at least one of the first client device or a third client device associated with the account of the first user; and
   receiving, at the first client device, one or more second updates from the second client device, the one or more second updates providing information regarding consumption of the electronic book on at least one of the second client device or a fourth client device associated with the account of the second user.

2. A method as recited in claim 1, wherein the one or more first updates further indicate at least one:
   a location in the electronic book that the first client device last displayed;
   a portion of the electronic book that the first user has completed;
   a reading speed of the first user;
   a time of day that the first client device displayed the electronic book; or
   a geographical location at which the first client device displayed the electronic book.

3. A method as recited in claim 1, wherein the invitation indicates at least one of: (i) that the second user will pay for some or an entire cost associated with the first user obtaining rights to the electronic book, or (ii) that the second user will perform an action for providing the electronic book to the first client device.

4. A first electronic device comprising:
   one or more processors; and
   one or more non-transitory computer-readable media storing computer-executable instructions that, when executed, cause the one or more processors to perform acts comprising:
   receiving an invitation for a first user of a first account that is associated with the first electronic device to consume a content item according to a schedule that approximately coincides with a second user of a second account that is associated with a second electronic device;
   sending a response to accept the invitation; and
   sending one or more updates to the second electronic device, the one or more updates indicating at least one of:
   a current location or a portion of the content item completed on at least one of the first electronic device or a third electronic device;
   a rate of consumption of the content item on at least one of the first electronic device or the third electronic device; or
   a geographical location at which at least one of the first electronic device or the third electronic device rendered at least a portion of the content item.

5. An electronic device as recited in claim 4, the acts further comprising receiving one or more additional updates from the second electronic device, the one or more additional updates providing information regarding consumption of the content item on the second electronic device.

6. An electronic device as recited in claim 4, the acts further comprising accessing the content item, and wherein the invitation is received at least partly in response to the accessing.

7. An electronic device as recited in claim 4, the acts further comprising indicating a desire to consume the content item, and wherein the invitation is received at least partly in response to the indicating.

8. An electronic device as recited in claim 4, wherein the invitation indicates that the second user will pay for some or an entire cost of the content item.

9. A method comprising:
   determining that a first user has indicated a desire to consume a content item;
   determining that a second user has indicated a desire to consume the content item;
   based at least in part on the determining that the first user indicated the desire to consume the content item and the determining that the second user indicated the desire to consume the content item, sending a recommendation to a first device associated with the first user, the recommendation indicating the second user to communicate with over a time period during which the first user and the second user consume the content item;
   receiving, from the first device, an indication that the first user has agreed to communicate with the second user over the time period;
   receiving, from a second device associated with the second user, an indication that the second user has agreed to communicate with the first user over the time period;
   receiving, from the first device, a first update regarding consumption of the content item on the first device;
   based at least in part on the receiving of the first update, sending the first update regarding the consumption of the content item on the first device to the second device;

receiving, from the second device, a second update regarding consumption of the content item on the second device; and based at least in part on the receiving of the second update, sending the second update regarding the consumption of the content item on the second device to the first device.

10. A method as recited in claim 9, further comprising:
determining content items previously consumed by the first user;
determining content items previously consumed by the second user;
determining a similarity between the content items previously consumed by the first user and the content items previously consumed by the second user; and
generating the recommendation based at least in part on the similarity.

11. A method as recited in claim 9, further comprising:
determining a first value of a consumption metric associated with the first user;
determining a second value of the consumption metric associated with second user;
determining a similarity between the first value and the second value; and
generating the recommendation based at least in part on the similarity.

12. A method as recited in claim 11, wherein:
the content item comprises an electronic book; and
the consumption metric indicates at least one of a reading speed of a user, an amount of time a user spends to complete the electronic book, or a time of day at which a user reads electronic books.

13. A method as recited in claim 9, further comprising sending commentary of the first user regarding the content item to the second device associated with the second user.

14. A method as recited in claim 9, further comprising:
based at least in part on the first update and the second update, providing access to one or more portions of the content item to the first device and the second device.

15. One or more non-transitory computer-readable media storing computer-executable instructions that, when executed on one or more processors, cause the one or more processors to perform acts comprising:
receiving, from a first electronic device, a first update indicating progress through a first portion of an electronic book by the first electronic device;
receiving, from a second electronic device, a second update indicating progress through the first portion of the electronic book by the second electronic device;
determining that at least one of the first electronic device or the second electronic device have progressed through an entirety of the first portion of the electronic book;
determining, based at least in part on the determining that the at least one of the first electronic device or the second electronic device have progressed through the entirety of the first portion of the electronic book, to grant access to a second portion of the electronic book; and
granting the first electronic device and the second electronic device access to the second portion of the electronic book.

16. One or more non-transitory computer-readable media as recited in claim 15, the acts further comprising providing, to the second electronic device, a third update indicating consumption of the electronic book on the first electronic device.

17. One or more non-transitory computer-readable media as recited in claim 15, the acts further comprising:
determining that the first electronic device and the second electronic device have progressed through the first portion,
and wherein the determining to grant the access is based, at least in part, on the determining that the first electronic device and the second electronic device have progressed through the first portion of the electronic book.

* * * * *

UNITED STATES PATENT AND TRADEMARK OFFICE
CERTIFICATE OF CORRECTION

PATENT NO. : 9,692,841 B1  
APPLICATION NO. : 14/298166  
DATED : June 27, 2017  
INVENTOR(S) : Otis Yeager Chandler et al.

Page 1 of 1

It is certified that error appears in the above-identified patent and that said Letters Patent is hereby corrected as shown below:

On the Title Page

Column 1, item (72), seventh inventor please add Brian David Rosenblat, Seattle, (WA)

Signed and Sealed this
Tenth Day of October, 2017

Joseph Matal
*Performing the Functions and Duties of the*
*Under Secretary of Commerce for Intellectual Property and*
*Director of the United States Patent and Trademark Office*